UNITED STATES PATENT OFFICE.

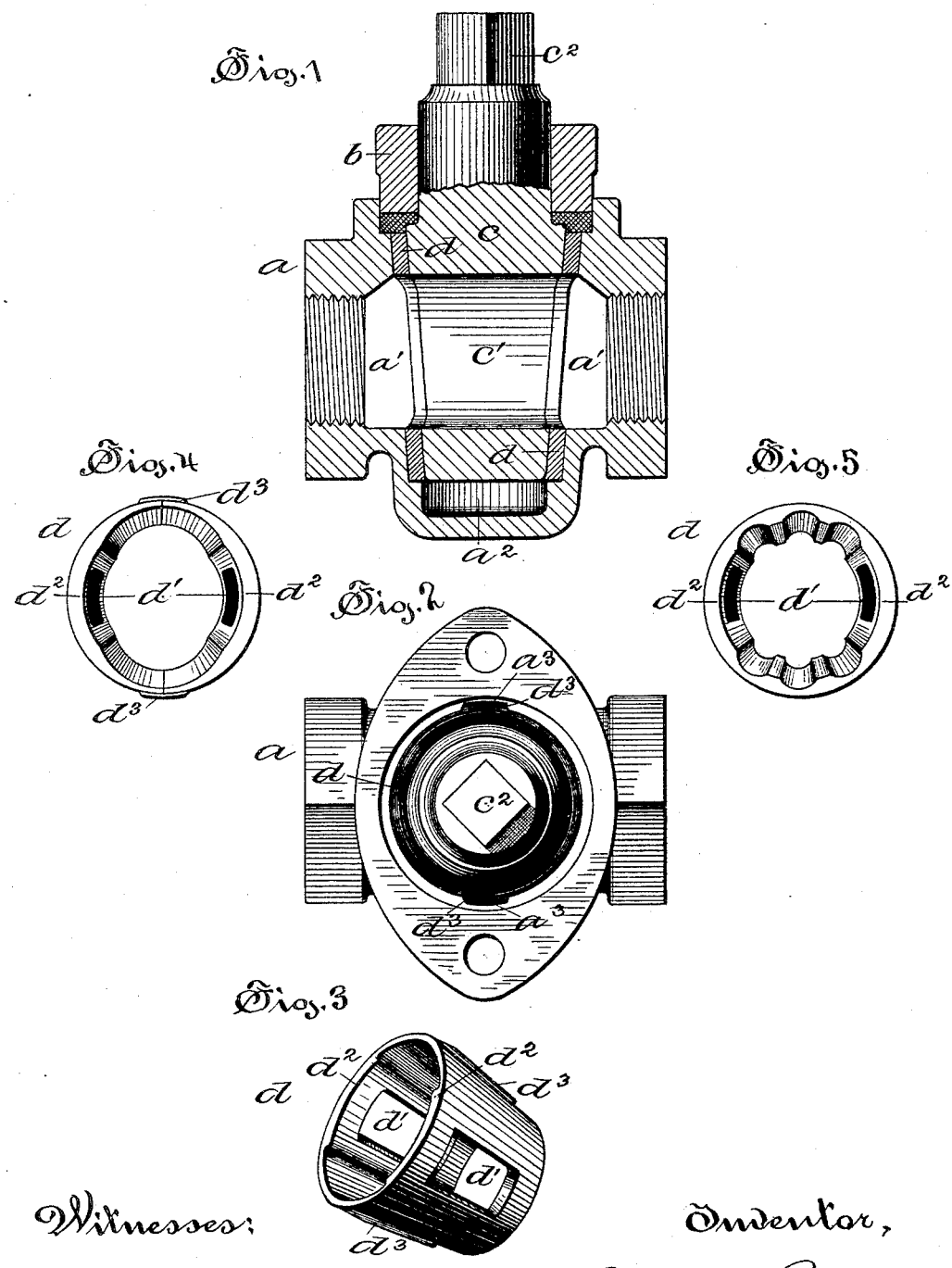

RUFUS N. PRATT, OF HARTFORD, CONNECTICUT, ASSIGNOR TO THE PRATT & CADY COMPANY, OF SAME PLACE.

COCK.

SPECIFICATION forming part of Letters Patent No. 461,084, dated October 13, 1891.

Application filed December 30, 1890. Serial No. 376,267. (No model.)

*To all whom it may concern:*

Be it known that I, RUFUS N. PRATT, a citizen of the United States, residing at Hartford, in the county of Hartford and State of Connecticut, have invented certain new and useful Improvements in Cocks, of which the following is a full, clear, and exact specification.

The invention relates to the class of plug-cocks having renewable linings, and the object is to provide a cheap readily-renewable lining for such cocks which can be inserted or removed without disturbing the cock from its connections, and which, while made hard, tough, and firm, of a material which will resist and protect the body of the cock from the action of steam or other gases, acids, or alkalies, and will stand the wear and tear of the moving parts, is so provided with seats that the plug will remain tight under all conditions without being so compressed as to produce an unnecessary amount of friction, whether the cock is connected with a pipe used for conveying hot or cold fluids, whereby the life and efficiency of the cock is increased.

To this end the invention consists in a cock having a readily-renewable lining of peculiar construction, as more particularly hereinafter described, and pointed out in the claims.

Referring to the accompanying drawings, Figure 1 is a central vertical longitudinal section of the cock. Fig. 2 is a plan view of the same with the bonnet removed. Fig. 3 is a perspective view of the lining, and Figs. 4 and 5 are plan views of modified forms of linings.

In the views, the letter $a$ indicates the body of the cock, which is cast to shape of metal in the ordinary manner, with a fluid-way $a'$ and plug-chamber $a^2$, and provided with a common bonnet $b$, which is bolted upon or screwed to the top of the body around the shank of the plug $c$, that has a way $c'$ within the body for the passage of fluid, and a stem $c^2$ without the body for the reception of an operating-handle.

The lining $d$ may be made of any desirable material, but is preferably molded from a pasty composition of asbestus, or equivalent acid-and-heat-resisting fibrous material, and liquid rubber or a similar cement gum, provided with a hardening agent, as sulphur, compressed in suitable dies and hardened to a rigid state by heat in a vulcanizer into the form of a tapering conical cell having openings $d'$, that correspond with the way through the plug. The exterior of this lining-cell is tapered and of such size that when loosely dropped into the plug-chamber it will tightly fit the walls of the body. The walls of this lining are made thicker at the openings $d'$, forming seats $d^2$ around the ports, and the plug $c$, which may be made of any common metal, as iron or brass, or iron covered with brass or composition, is turned tapering to a size that will fit the walls of the cell at its thicker parts, but leave a space between itself and the thinner walls of the cell which hold the thicker or side portions together. A rib or projecting portion $d^3$ is preferably formed upon the exterior or lining, and is adapted to fit into a corresponding groove $a^3$, cut or cast in the walls of the body of the plug-chamber, to prevent the lining from turning when the plug is rotated, and if the lining is formed in two sections, as shown in Fig. 4, which are cemented together, these ribs $d^3$ may be laid over the seam at the joint between the sections and aid in holding the sections together, which is very desirable, as the joint is usually made at the thinner portion of the lining.

In the form of lining shown in Fig. 3 the thinner walls are formed on a circle concentric with the thicker walls, and in the form shown in Fig. 4 the thinner walls are formed on a circle eccentric with the thicker walls, while in the form shown in Fig. 5 the interior is cut away on several small circles, leaving a number of projecting bearing-surfaces or seats that rest against the plug to make a tight joint.

With my improved lining removable seats are cheaply formed which can be readily and quickly renewed when they become worn, and the seats are so joined together by the thin walls of the same material which completely protects the interior of the cock from steam or gases, acids or alkalies, that no frame for for the support nor machine-work on the interior of the chamber is required to cut sockets for the retention of the seats in their places around the ports, while any sand or grit which becomes caught between the plug and lining is not carried around so as to cut and wear the parts; but it can escape into the spaces formed by the thinning out of the walls of the lining, from which space it drops to the bottom of the cock. This lining is very firm and tenacious, the fibrous material giving the cell great tensile strength, while the high heat of the vulcanizer so hardens the material that the cell is formed rigid, so that but a small bearing or seat is needed to which the plug is required to fit, so that the cock can be made and kept tight without fastening down the bonnet so closely that there will be a great amount of friction between the plug and the lining, into the composition of which a lubricant, as soapstone or plumbago, may be mixed, if desired. A lining formed in this manner is sufficiently elastic to permit the expansion of the plug under heat without any special wear or tear upon the parts caused by the enlargement upon the plug.

I claim as my invention—

1. In combination with the body and plug of a cock, a tapering cell having openings through its side walls, which cells are of varying thickness, loosely held between the body and the plug, whereby a portion only comes in contact with the plug, substantially as specified.

2. In combination with the body and plug of a cock, a tapering cell having openings through its side walls, loosely held between the body and the plug, a portion of the interior of said cell being concentric with and a portion eccentric with the plug, substantially as specified.

3. In combination with the body and plug of a cock, a tapering cell formed of vulcanized fibrous material with openings through its side walls, said walls of varying thickness, loosely held between the body and the plug, substantially as specified.

RUFUS N. PRATT.

Witnesses:
JUSTUS P. LEWIS,
HARRY R. WILLIAMS.